United States Patent [19]

Little

[11] 4,306,272

[45] Dec. 15, 1981

[54] TUBULAR CAPACITOR

[75] Inventor: Roger G. Little, Bedford, Mass.

[73] Assignee: Spire Corporation, Bedford, Mass.

[21] Appl. No.: 76,592

[22] Filed: Sep. 18, 1979

[51] Int. Cl.³ .................. H01G 1/02; H01G 4/28
[52] U.S. Cl. ........................ 361/303; 361/301; 361/323; 361/326
[58] Field of Search ............ 361/301, 323, 303, 326, 361/310

[56] References Cited

U.S. PATENT DOCUMENTS

| | | | |
|---|---|---|---|
| 814,951 | 3/1906 | Fessenden | 361/303 |
| 1,545,207 | 7/1925 | Smith | 361/326 |
| 1,870,141 | 8/1932 | Regerbis | 361/301 |
| 2,871,545 | 2/1959 | Weldon | 361/301 X |
| 2,995,688 | 8/1961 | Rosenberg | 361/323 |
| 3,339,130 | 8/1967 | Schaeffer | 361/301 |

*Primary Examiner*—E. A. Goldberg
*Attorney, Agent, or Firm*—Morse, Altman, Oates & Dacey

[57] ABSTRACT

An electron beam processor with an energy storage line and matched field emission diode that define a high energy electron beam generator. A transport system positions a specimen to be thermally processed in a processing station. Energy stored on the line is discharged through the diode and the resulting high energy beam impacts upon the specimen for thermally processing selected regions thereof. A tubular capacitor is disclosed for use in the processor. The capacitor (electrical energy store) has a shape so that it can be secured in coaxially in a pressure vessel. An outer electrode of the capacitor can include a mesh screen.

4 Claims, 5 Drawing Figures

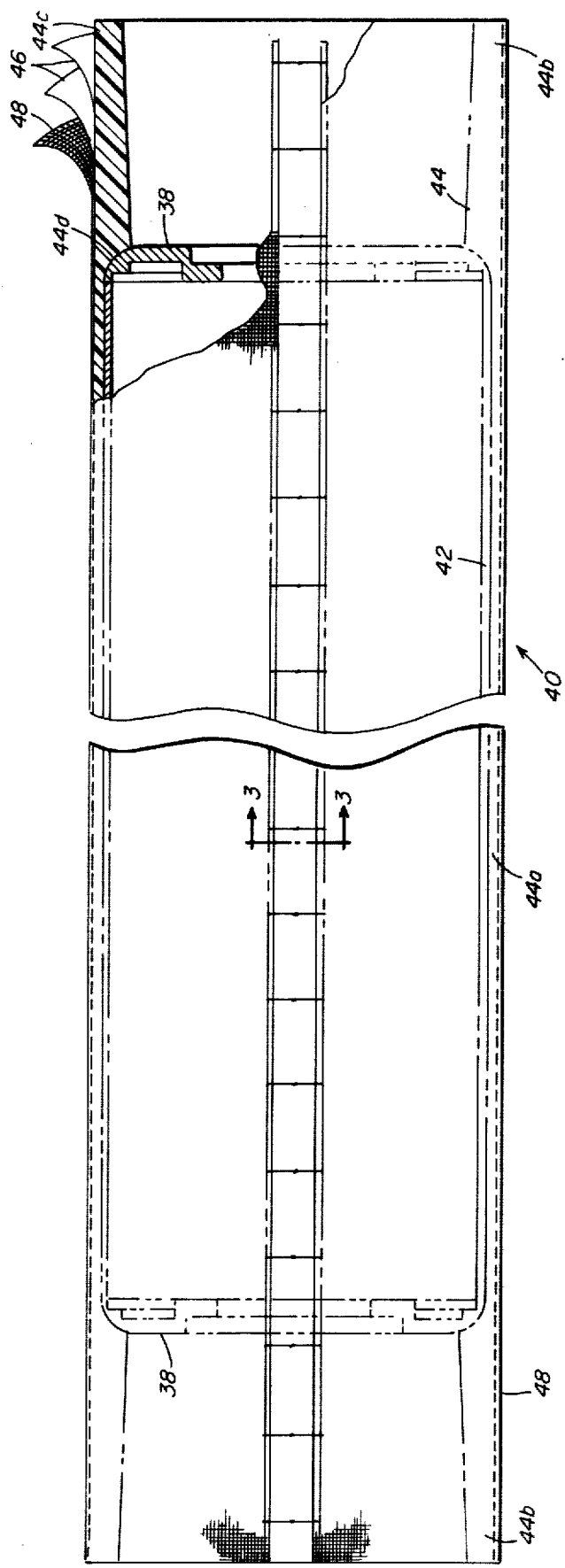
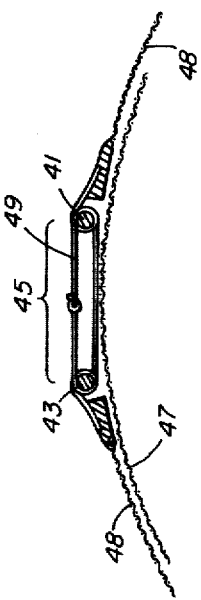
FIG. 2
FIG. 3

4,306,272

TUBULAR CAPACITOR

BACKGROUND OF THE INVENTION

1. Field of the Invention

The present invention relates to processing devices and, more particularly, is directed towards electron beam processors.

2. Description of the Prior Art

Thermal processing has become widely employed in the manufacture of semiconductors and crystals, such as diodes, solar cells, transistors, integrated circuits and the like. Examples of commonly employed thermal processing techniques include annealing of crystalline structures after mechanical or radiation induced damage, diffusion of dopants into semiconductors, annealing and electrical activation of dopant atoms after ion implantation, sintering of metallic and dielectric coatings to improve mechanical and optical properties.

Conventional techniques for thermal processing of semiconductor devices are performed in a furnace type facility by elevating the temperature of the entire device and by maintaining that temperature environment for a period adequate to produce the required thermal effects. Such techniques have had limited application due to the fact that many semiconductor materials and silicon structures degrade as a result of the thermal exposures that are required to produce such thermal effects.

SUMMARY OF THE INVENTION

An object of the present invention is to provide an electron beam processor for thermal processing of a specimen which does not suffer from the heretofore mentioned disadvantages and limitations.

Another object of the present invention is to provide an electron beam processor for thermal processing of selected regions of semiconductor, dielectric and metallic specimens.

A further object of the present invention is to provide an electron beam processor with an energy storage line and matched field emission diode that define a high energy electron beam generator. Energy stored on the line is discharged through the field emission diode for generation of a high energy electron beam. A semiconductor, dielectric or metallic specimen is moved by a transport system into a beam chamber where the electron beam impacts upon selected regions of the specimen. The temperature of the impacted regions is elevated to a temperature at which thermal processing takes place.

Other objects of the present invention will be in part obvious and will in part appear hereinafter.

The invention, accordingly, comprises the method and apparatus, together with their parts, steps, elements and inter-relationships that are examplified in the following disclosure, the scope of which will be indicated in the appended claims.

BRIEF DESCRIPTION OF THE DRAWINGS

A fuller understanding of the nature and objects of the present invention will become apparent from consideration of the following detailed description, taken in connection with the accompanying drawings, wherein:

FIG. 2 is a front elevational view, partly in section, and on an enlarged scale, of the energy storage line of FIG. 1;

FIG. 3 is a sectional view taken along the lines 3—3 of FIG. 2;

DETAILED DESCRIPTION OF THE PREFERRED EMBODIMENT

The present invention provides an electron beam processor for localized thermal processing of specific regions of semiconductor, dielectric, metallic and crystalline devices by momentarily elevating the temperature of the device, particularly at its surface. To this end, a short duration pulsed electron beam is directed towards the specific regions of the device to be processed. The desired thermal processing effect occurs when the temperature in the region to be processed exceeds a temperature threshold level.

Figure 1:
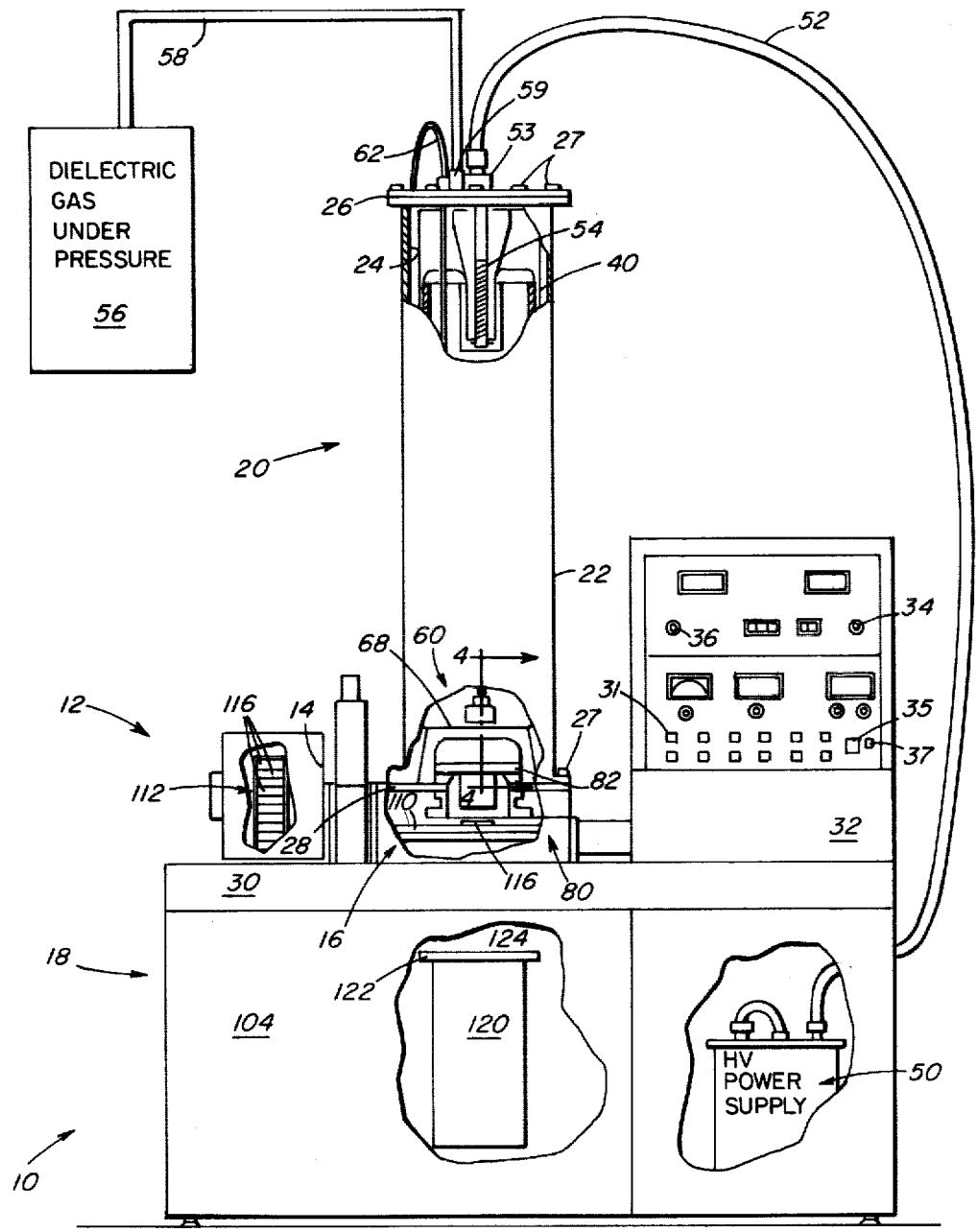
FIG. 1 is a front elevational view, with parts broken away, and block diagram of a system embodying the present invention.

Referring now to the drawings, particularly to FIG. 1, there is shown a system 10 for electron beam processing of semiconductor, dielectric and metallic materials. Semiconductor materials to be processed include silicon, germanium, gallium arsenide, gallium phosphide, indium phosphide, cadmium telluride, cadmium sulfide and the like, for example. System 10 comprises an electron beam pulse generator 20, a sample processing system 12, and a modularly constructed base cabinet 18 housing the processing and control equipment, such as a vacuum support structure 104 and oil-immersed, high voltage power supply 50. A table top 30 encloses the base cabinet 18 and preferably has a smooth, hard surface so as to stay dust-free and is also impervious to common organic cleaning fluids. The table top 30, in addition to carrying the sample processing system 12 and the electron beam pulse generator 20, has adjacent thereto an electronic cabinet 32, including an operator's console, with buttons required to operate the system of the invention. The oil-immersed power supply 50 has a 120 VAC input and has a zero to 100 KVDC output, and is designed to supply power to the pulse generator 20. Power supply 50 connects to the pulse generator 20 via a high voltage cable 52 entering a pressure vessel 22 of the pulse generator 20 through a pressure tight connector 53 mounted in a top cover plate 26 thereof, and plugs into a high voltage isolation resistor 54. The pressure vessel 22 is an aluminum cylindrical tank rated to 100 PSIG. Vessel 22 contains the energy store 40 in its hollow interior 24 which is pressurized with a dielectric gas from a source 56 admitted therein via a suitable, pressure tight connector 59 formed in the top cover plate 26. The pressurized dielectric gas is needed to retard corona and arcing. Energy store 40 is essentially a high voltage capacitor which serves as a transmission line during discharge to a field emission diode 80 mounted on the bottom end plate 28 of pressure vessel 22. A trigger switch assembly 60 is operatively mounted within the lower end of the energy store 40 and in close proximity to the field emission diode structure 80.

It is into the vicinity of the field emission diode structure 80 that the sample transport and processing system 12 presents a sample for thermal processing thereof. It should be noted that the sample transport and processing system 12 is maintained under vacuum by a vacuum source 120, provided with a suitable load-lock valve 122 and filters 124.

The sample transport and processing system 12 comprises a cassette load-lock 14 and a processing chamber 16. Samples 118 to be processed are loaded, one above the other, into a multi-carrier, vertically constructed cassette 112 which is introduced into load-lock 14. Each sample 118 goes into an individual carrier 116 consisting of a central region of graphite and an outer plate of aluminum. The graphite serves as a passive holder for samples of varying geometry during transport and processing. After the loaded cassette 112 is placed in the load-lock 14, stepwise valve sequencing, controlled by sensors and relays coupled to a digital logic located within cabinet 18, brings the load-lock 14 and processing chamber 16 smoothly down to the desired level of vacuum. During the valve sequencing, a pneumatically driven transport arm 110 extends across the load-lock 14/processing chamber 16 interface, couples with an individual sample carrier 116, and draws the carrier into position in the processing chamber 16 in the vicinity of the field emission diode structure 80 for pulsing. After pulsing, the transport arm 110 returns the carrier 116 to the cassette 112, and the next carrier 116 is moved into position by an elevator driven by a stepper motor. The transfer-processing-transfer sequence continues until all the samples have been processed, at which time the load-lock valve 122 to the processing chamber 16 is closed, the lock 14 is vented, and the cassette 112 is removed for sample analysis. The process continues with the loading of another cassette 112 and the initiating of another pump down of the load-lock 14 by vacuum source 120. The process ends with the removal of the last cassette 112 from the load-lock 14, and the venting of both the lock 14 and processing chamber 16.

The electrical energy store (capacitor) 40 of the electron beam processor system 10 is shown in greater detail and on an enlarged scale in FIGS. 2 and 3. It comprises an inner electrode 42, preferably of tubular construction, and provided with plates 38 at its respective ends. Electrode 42 is insulated about its entire outer periphery by an epoxy resin cast thereabout and comprising a cylindrical sleeve portion 44a of even thickness and reinforced tapered ends 44b extending beyond the end plates 38 thereof. The shoulders of plates 38 are securely held by arcuate portions 44d, forming the connecting link between sleeve 44a and ends 44b. These reinforced tapered ends 44b are dedigned to hold energy store 40 securely and coaxially within the pressure vessel 22 so as to have an even annular space separating its cylindrical sleeve 44a from the inside 24 of vessel 22. The tapered ends 44b are respectively secured, such as by screws 45, both to the top cover plate 26 and the bottom end plate 28 of vessel 22, as may be best noted in FIG. 4. An outer electrode is formed on the periphery 44c of the insulating member 44, and it comprises one or two coats of a conductive paint 46. These can be further enveloped by an aluminum mesh screen 48. For most applications, the aluminum mesh screen 48 is not necessary, especially when there are two coats 46 of conductive paints provided. When used, mesh screen 48 is preferably replaceably mounted about the outer periphery 44c of the epoxy-resin insulation 44 and over the conductive coats of paint 46. This is done by cutting it to size so as to envelope, except for an axial seam 45 the entire periphery 44c of energy store 40. Seam 45 is closed as follows. At the edges of the seam 45, a pair of parallel rods 41, 43 extending along the axial length of energy store 40 are provided, about which the ends of the screen are conveniently folded. A strip 47 of aluminum mesh screen, encompassing more than the area of the seam 45, is positioned under the seam 45 so that there is a complete electrical contact about the periphery 44c of energy store 40. At spaced intervals, perhaps one or two inches apart, monofilament nylon lines 49 are wrapped about rods 41 and 43 so as to retain the mesh screen 48 tight about the periphery 44c of energy store 40.

Figure 4:
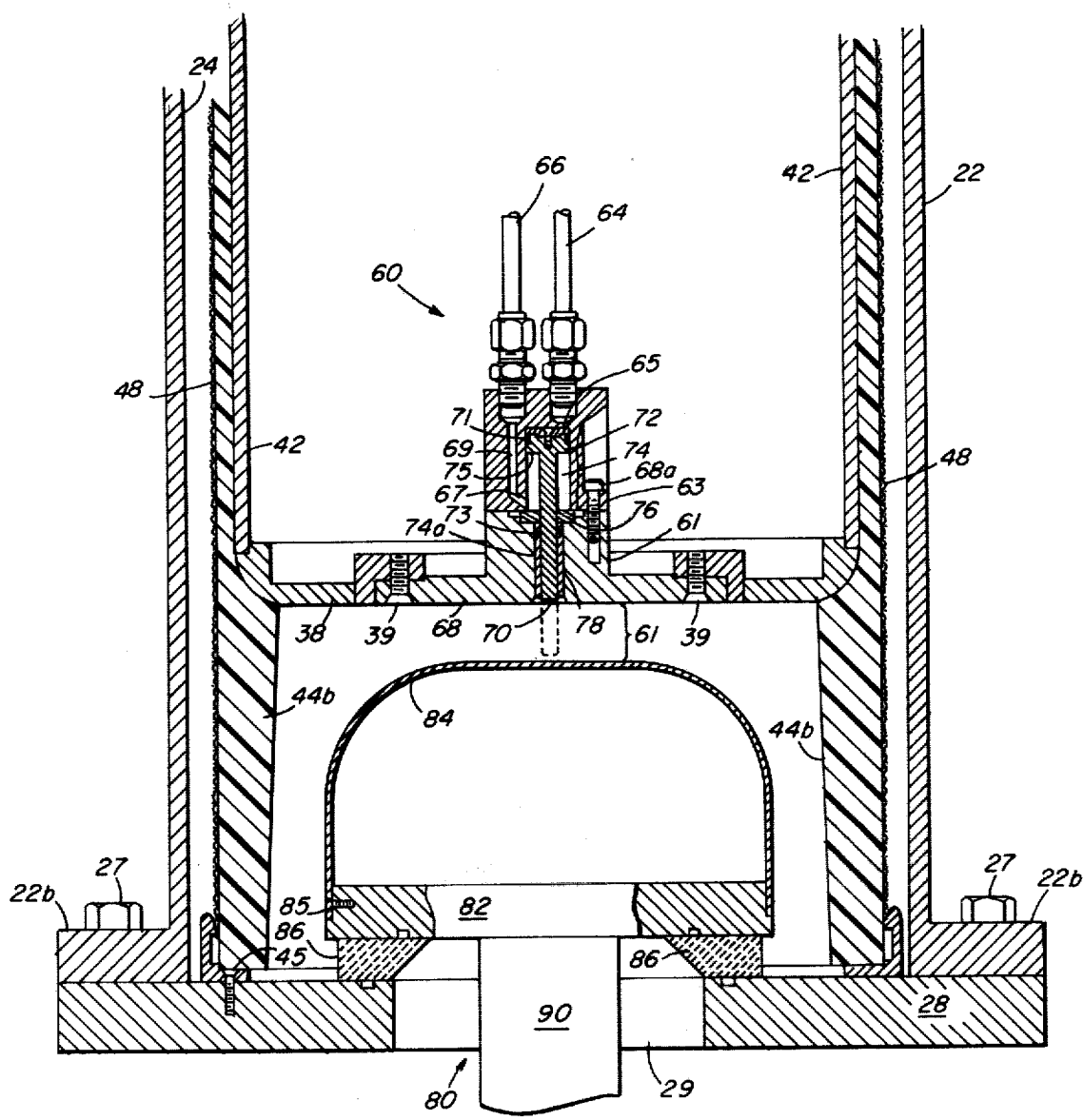
FIG. 4 is a sectional view taken along the lines 4—4 of FIG. 1.

A trigger switch assembly 60 is mounted concentrically within the lower end of energy store 40 and is essentially an electro-pneumatically actuated device, observe FIG. 4. Trigger switch assembly 60 is secured within the end plate 38 by bolts 39 and comprises a block 68 to which pneumatic pipes 64 and 66 are shown connected. These pipes 64 and 66 connect with a pneumatic cable 62 that is connected to the base cabinet 18 so as to admit air under pressure, first into one and then into the other of the pipes 64 and 66. Block 68 comprises an outer part 61 and an inner part 63 secured to each other by bolt 68a. Inner part 63 is formed with a cylindrical chamber 74 and part 61 with a central opening 74a coaxial with chamber 74 but having a smaller diameter. A sleeve 78 having an annular shoulder 76 is accommodated within central opening 74a, with sleeve 78 not quite reaching the outer periphery of block 68 and with shoulder 76 forming the interface between parts 61 and 63. A trigger rod 72 is designed to be axially displaceable within sleeve 78 and chamber 74 respectively between an inoperative withdrawn portion shown in solid lines and an operative, extended position shown in phantom lines. Pipe 64 is designed to admit air to the back 65 of shoulder 72 so as to displace rod 70 until its front 75 strikes shoulder 76. Pipe 66, on the other hand, admits air via channel 69 and vent 67 into the front of the chamber 74 so as to operate on front 75 of shoulder 72 and effect the withdrawal of trigger rod 70 from its extended operative position into its shown inoperative position. A pair of "O" rings 71 and 73 are shown provided in shoulder 72 and sleeve 78, respectively.

It should be noted that once energy store 40 has been suitably changed, a high voltage spinning surrounds the periphery of actuating block 68, particularly in the vicinity of trigger rod 70.

Figure 5:
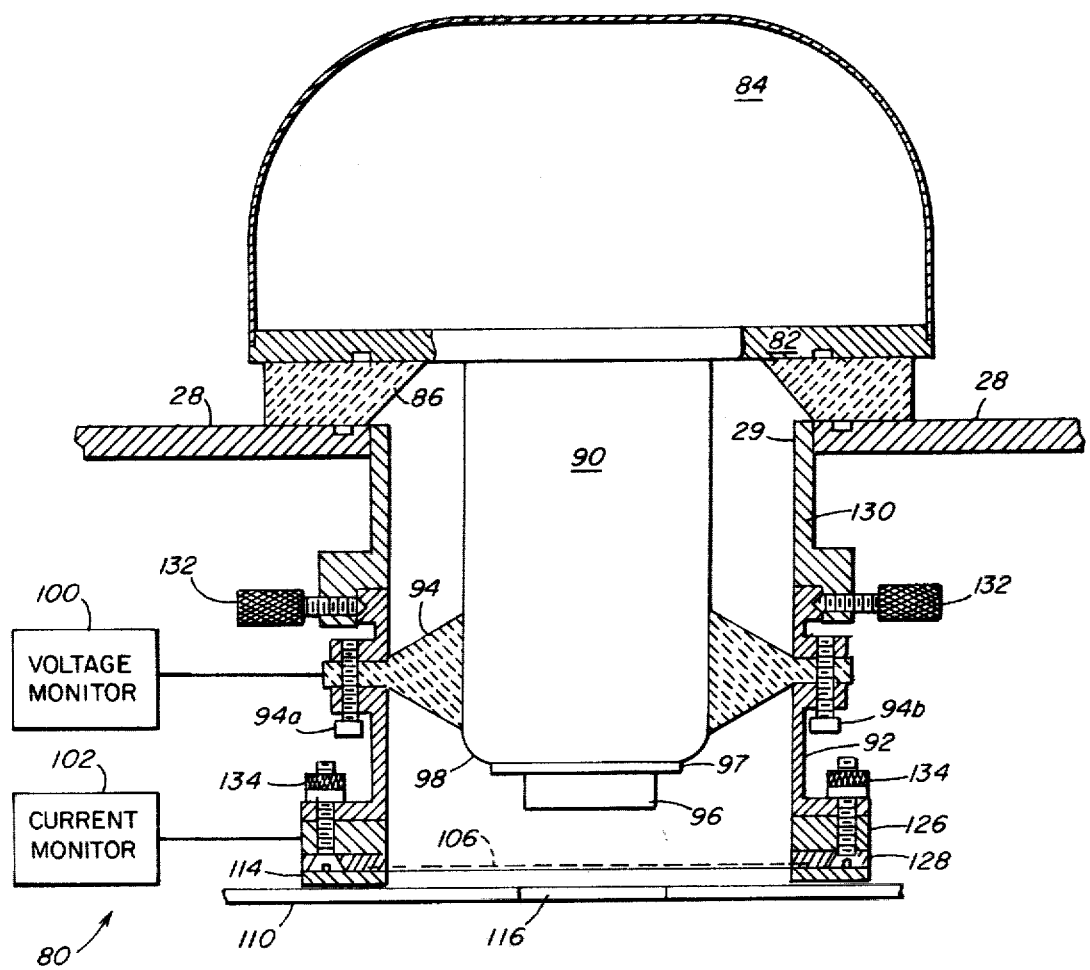
FIG. 5 is a front elevational view, partly in section of the field emission diode of FIG. 1.

As may be noted from FIGS. 4 and 5, the field emission diode structure 80, formed of an upper and a lower section, is operatively mounted within an axial hole 29 of the bottom plate 28 of pressure vessel 22. Its upper section comprises a tube cap 82 having a trigger dome 84 and mounted by means of a dielectric ring 86 onto the bottom plate 28. Dielectric ring 86 serves to insulate the upper section from ground, and also serves as the pressure interface between the pressurized inside 24 of pressure vessel 22 and the evacuated processing chamber 16, which houses the diode structure 80. An annular member 130, still part of the upper section, is secured to the bottom plate 28. A pair of retaining set screws 132 removably secure the lower section of diode 80 to its upper section. The lower section is contained within a diode housing 92. Diode housing 92 is conveniently removable from processing chamber 16 for servicing or adjustment by loosening these retaining screws 132. This lower section is an integral assembly and comprises an insulating support member 94 carrying cathode shank 90, having a shank head 98 and removeably secured thereto a cold cathode 96. Screws 94a and 94b secure member 94 to diode housing 92, which also serves as the outer conductor. Insulating support member 94, in supporting the cathode shank 90 and thereby cathode 96, also maintains close parallelism with the plane of anode 106. Housing 92 also accommodates an anode structure that comprises anode ring 126 and a support ring 128, held therein by nuts and bolts 134, so as to hold thereto a mesh screen anode 106. In order to vary the gap separating the cold cathode 96 from the anode 106, a plurality of shims 97 are interposed between the cathode and the shank head 98. In order to adjust the gap between the anode 106 and a sample 116 moved into position by a pneumatically operated transport 110, again, one or more shims 114 are provided as spacers adjacent the support ring 128. Prior to the removal of the lower section of the field emission diode structure 80, that is, the parts just described, it is essential to disconnect any cables that may be connected to a current monitor 102 or to a voltage monitor 100, if they are provided.

The heating of a sample surface depends upon the electron energy spectrum, the total fluence in the beam, and the pulse width. Increasing the pulse width allows deposited thermal energy to diffuse into the bulk of the sample, lowering the surface temperature and reducing the thermal gradient. The surface temperature is approximately proportional to the total fluence, neglecting a change in phase such as melting, if the pulse width is short. For very short pulse widths, less than the characteristic thermal diffusion time for depth of penetration considered, the average electron energy will control the near-surface temperature profile and depth dose of energy deposited in the material.

The four quantities, namely, electron energy, fluence, pulse width, and total beam energy, are dependent variables in that they cannot be varied independently of the other variables. The independently adjustable parameters of the electron beam processor include the charging voltage, the cathode radius, the cathode-to-anode gap, and the sample-to-anode distance, i.e., the drift region. The total beam energy and fluence increase approximately as the square of the charging voltage, while the average electron energy is directly proportional to the charging voltage. An increase in both the cathode radius and the cathode-to-anode gap is used to vary the fluence with a minor change in other parameters. The total beam energy and fluence will vary, depending upon the matching of the load represented by the field emission diode structure 80 to the impedance of the electron beam generating means, particularly its energy store 40 thereof. A decrease in the cathode-to-anode gap will also shorten the pulse width. By varying the sample-to-anode distance, on the other hand, one can adjust the self-focusing of the electron beam and its propagation efficiency. This varies the fluence but not the electron energy.

Main vacuum support structure 104 contained in base cabinet 18 is a welded frame for supporting the superstructure above it, including the pulsing means 20, the sample transport and processing system 12, and the electronic cabinet 32. The electric and pneumatic power distribution panels are also attached to this frame. Internal air control and electronic harness lines are laced into channels within the welded frame for routing to the processing and control sensors and operators. It is imperative that these channels are shielded to protect the lines from radio-frequency interference (RFI) and also from electromagnetic interference (EMI) emanating from the pulser 20 when it is in use.

Easily removed access panels permit the convenient checking and servicing of these electrical and mechanical support structures. The electronic cabinet 32 serves as the operator's console. From this console, the operator controls the electron beam pulse parameters and initiates charging and discharging of the energy store 40; the operator also controls the sequencing and operating of the valves and pumps associated with the sample transport and processing system 12.

The current produced in the field emission diode 80 is space charge limited and behaves according to the Child-Langmuir relation:

$$I = \frac{8\pi}{9\sqrt{2}} \frac{\epsilon_0 e}{\mu_0 mc^2} \left(\frac{r}{d}\right)^2 V^{3/2}$$

$$= 2.33 \times 10^{-6} \left(\frac{r}{d}\right)^2 V^{3/2} \text{ amperes}$$

where r equals the cathode radius in centimeters, d equals the diode gap in centimeters, and V the applied voltage in volts. This equation holds only when the diode 80 is fully emitting. At the start of the pulse, electron emission is confined to the corners of the cathode 96. Microscopic carbon grains carry the current, and at the high applied electric field strength, are rapidly heated to the vaporization point. The small grains explode, forming a carbon plasma. The large electron beam current is emitted from this plasma, which expands to cover the whole diode area. As the plasma drifts from the cathode 96 towards the screen mesh anode 106, the effective cathode-to-anode gap is reduced at a near-constant rate, which is approximately 2.5 cm. per microsecond. This gap reduction causes the diode impedance to change in time through its dependence upon the diode gap.

The screen mesh anode 106, when bombarded by the intense electron beam, may also form a plasma which drifts towards the cathode 96 and closes the gap at a rapid rate. The gap closing emanating from the anode 106 only occurs at fluences in excess of 1 joule per square centimeter. It must be noted that the spacing between the wires of the anode mesh 106 must be less than the cathode-anode gap 96, 106, and preferably less than half that gap, so that the diode resembles a planar configuration. At larger mesh spacings, non-uniform emission results. The sample 116 can be used in place of a mesh anode 106. However, because early beam emission from the cathode is not planar, the fluence will be less uniform.

When the cathode-produced plasma touches the anode 106, or the anode-produced plasma touches the cathode 96, the diode 80 is shorted. In this case, the diode current is carried by the plasma, and there is no intense electron beam. This occurs only for very small gaps between the cathode and the anode (about two millimeters or less) and can be used to reduce the pulse width. The pulse width can also be reduced by the plasma formed when the intense electron beam ionizes residual gas between the cathode and the anode. This effect is significant for pressures above $2 \times 10^{-4}$ torr (air).

A separate anode 106 is used because the mechanical tolerances on the cathode-anode gap are very tight and sensitive to any anode materials that are easily vaporized. Using a mesh anode 106, rather than having the electron beam from the cathode 96 impinge directly on a sample 118, increases flexibility in the choice of target and improves beam uniformity.

The electron beam current can exceed 1 kA, depending upon diode impedance and charging voltage. At this level, self-interactions between charges in the beam dominate propagation of the current. Electrostatic repulsion tends to improve beam uniformity, since density perturbations may be unstable. Uniformity also improves with increasing drift distance. To the extent that the cathode-anode and sample anode spacings are smaller than the beam radius, the current can be considered to be conducting between large parallel conducting plates. Here, the self-magnetic field of the beam causes focusing when the radial electric field is reduced by the presence of near, conducting planes. Since the radial electric field is affected by the spacing between conductive plates, the self-focusing effect can be varied by changing the sample anode distance. At large spacings, the electron beam tends to expand radially to the outer vacuum chamber walls, reducing the fluence on the sample despite focusing effects.

The cold cathode 96 is preferably made of graphite, and the screen mesh anode 106 of refractory material. Transparency of the anode mesh screen 106 may be increased or decreased at the expense of anode lifetime. The reduction in current density by blocking anodes can vary the fluence on samples 116 without changing the electron energy spectrum, provided that the charging voltage, the cathode-anode gap, and the anode material are not changed. The effect is only approximately linear, since reducing beam current affects self-focusing.

The operation of the electron beam processor system 10 of the invention is as follows: After the high-voltage power supply system 50 has been plugged into a suitable outlet of 120 volts AC power supply, the High-Voltage On button 31 on the console cabinet 32 is depressed. Then, the operator presses the Meter-On button 36 and holds it down while turning the High-Voltage Control knob 34 until the desired voltage on the energy store 40 is reached. A transient charging current of up to 200 micro-amperes is to be expected and indicates normal capacitive charging of the energy store 40. The high-voltage resistor 54 isolates and protects the power supply 50 from surges. The high-voltage power supply 50 can be deenergized by pressing the High-Voltage Off button 37. A loaded cassette 112 has already been placed in the load-lock 14 and it and the processing chamber 16 have been brought down to the required level of vacuum, and the pneumatically driven transport arm 110 has drawn an individual sample carrier 116 into the vicinity of the field emission diode structure 80, just below the screen mesh anode 106 ready to be thermally processed by the system 10 of the invention. After about three to five seconds of charging, the energy store 40 will have attained its maximum energy at 100 kilovolts of about 20 joules. The system is now ready to direct an electron beam at a sample 118 carried in carrier 116. To initiate this, the operator depresses Trigger Button 35, which causes trigger rod 70 to bridge the gap 61 between the high-voltage spinning about the periphery of actuating block 68 and the trigger dome 84 of the field emission diode structure 80, initiating thereby a pulse into the diode. The dielectric ring 86 isolates the tube cap 82 from ground, providing up to 150-kilovolt voltage holdoff during the output pulse. A large electron beam current is then emitted from a plasma produced between the cold cathode 96 and the screen mesh anode 106, which expands to cover the whole diode area. This electron beam then heats the surface of the sample 118 to above the threshold temperature, possibly melting a thin layer thereof, without however, heating the bulk of the sample material 118. The short-duration pulsed annealing causes superior electrical conductivity in the implanted region in the sample 118; it also can anneal ion-implantation, radiation-induced damage in the crystal, or it can produce sintering or other desired processing. The processed wafer carriers 116 emerge from the load-lock cassette 14 in minutes, and are immediately ready for final testing.

The preferred dielectric gas is air or dry nitrogen under 80 pounds per square inches pressure. However, other dielectric gases, such as Freon G-12, and the like may be also used in the electron beam processor of the invention.

The present invention thus provides an improved electron beam processor of novel construction in which a uniquely designed and constructed energy store is matched to a field emission diode assembly in such a way as to achieve better control over the propagating electron beam to be used in the thermal processing of wafers and crystals placed in the vicinity thereof.

Since certain changes may be made in the foregoing disclosure without departing from the scope of the invention herein involved, it is intended that all matter contained in the above description and shown in the accompanying drawings be construed in an illustrative, and not in a limiting sense.

What is claimed is:
1. An electrical capacitor comprising
   (a) a tubular inner electrode having end plates at its respective ends;
   (b) insulating means formed of an epoxy-resin cast about said inner electrode and including a cylindrical sleeve portion of even thickness and reinforced tapered ends extending beyond said end plates of said electrode and arcuate portions forming the connecting link between said sleeve portion and said tapered ends, whereby said inner electrode is securely held by said insulating means; and
   (c) an outer electrode formed about said insulating means.
2. The electrical capacitor of claim 1 wherein said outer electrode comprises a layer of conductive paint.
3. An electrical capacitor comprising
   (a) a tubular inner electrode;
   (b) insulating means formed of an epoxy-resin cast about said inner electrode and having tapered ends extending beyond said electrode; and
   (c) an outer electrode formed about said insulating means, said outer electrode comprising a layer of conductive paint enveloped by a mesh screen.
4. The electrical capacitor of claim 3 wherein said mesh screen is replaceably mounted.

* * * * *